Nov. 1, 1932.　　　S. P. LARSON　　　1,885,453
PAN GREASING MACHINE
Filed March 2, 1931　　　2 Sheets-Sheet 1
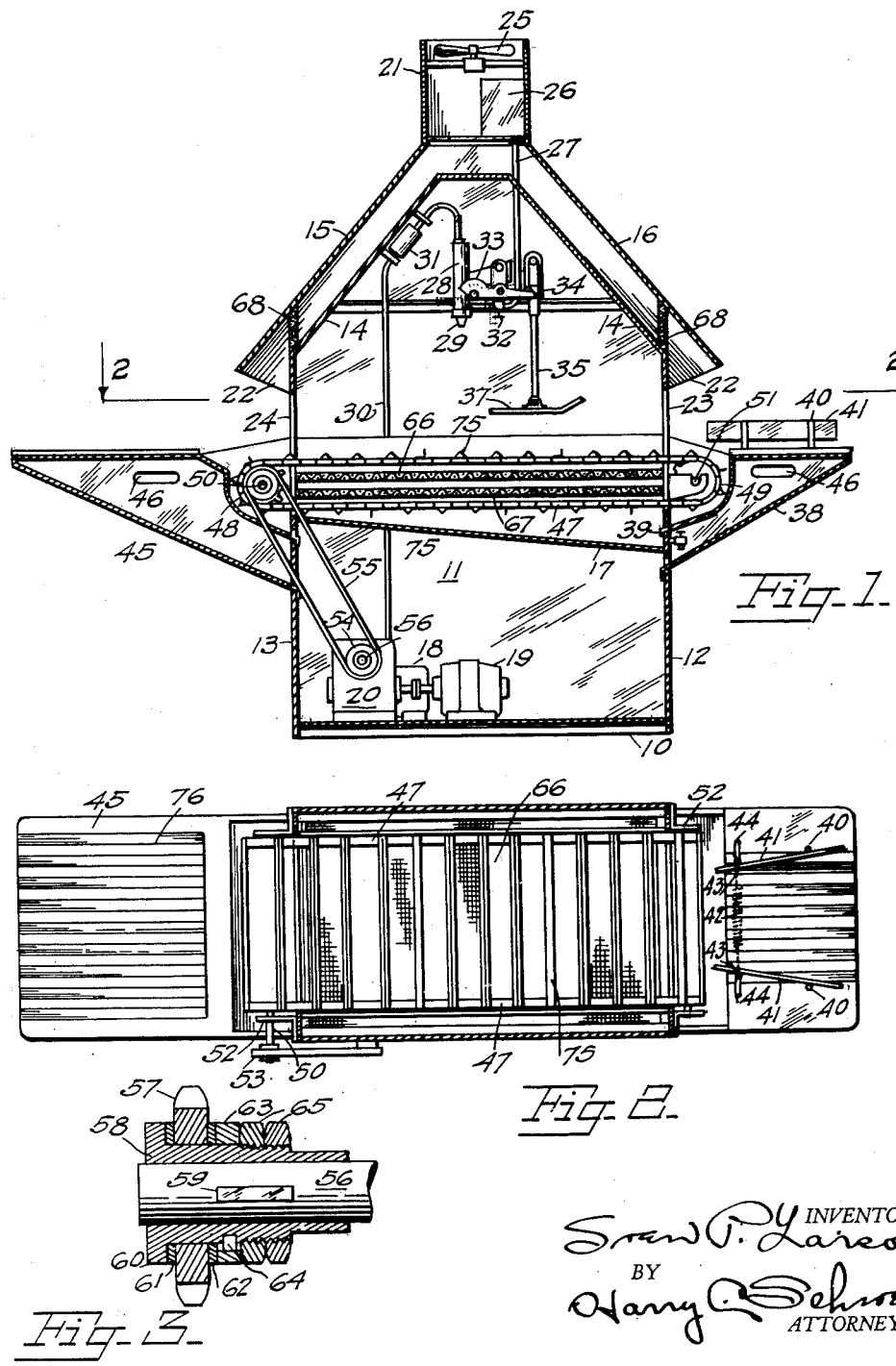

Nov. 1, 1932.   S. P. LARSON   1,885,453
PAN GREASING MACHINE
Filed March 2, 1931   2 Sheets-Sheet 2
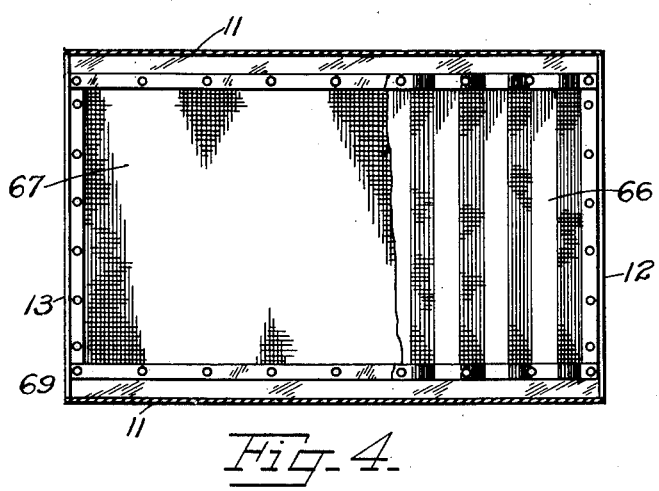
Fig. 4.
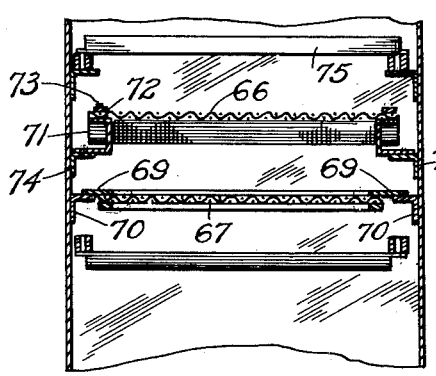
Fig. 5.
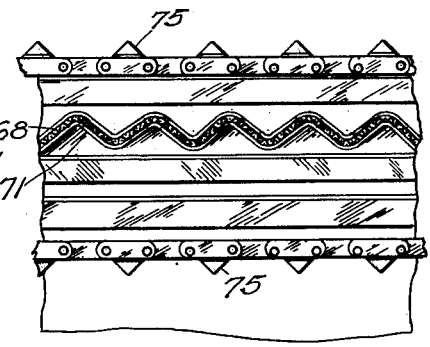
Fig. 6.
Fig. 9.
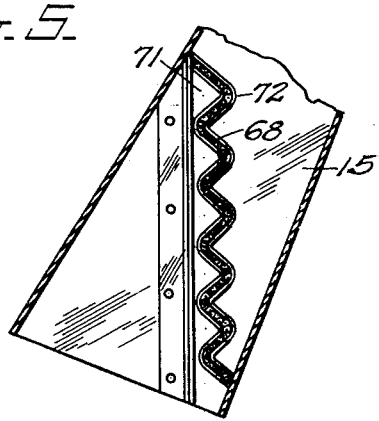
Fig. 7.
INVENTOR.
Sven P. Larson
BY Harry C. Schroeder
ATTORNEYS.

Patented Nov. 1, 1932

1,885,453

UNITED STATES PATENT OFFICE

SVEN P. LARSON, OF BERKELEY, CALIFORNIA

PAN GREASING MACHINE

Application filed March 2, 1931. Serial No. 519,398.

This invention is for a pan spraying machine and has special reference to a machine adapted to the automatic greasing of baking pans.

The objects of the invention are:

First: To provide a pan greasing machine which will provide a uniform, thin film of oil or grease over the entire baking surface of a pan without deposition of oil on the bottom or outer surfaces, whereby smoking in the oven is obviated.

Second: To provide adjustable means for spraying the oil whereby the oil film may be regulated to the actual requirements for the specific baked goods.

Third: To provide an efficient condenser system for condensing and collecting all unused spray, resulting in maximum economy and cleanliness, as by my method none of the oil is permitted to escape either in the form of mist or vapor, therefore the oil will not permeate the room in which the machine is operated.

Fourth: To provide a machine as outlined with a conveyor which is provided with means to prevent jamming, avoiding thereby the possibility of damaging the pans.

Other objects and advantages of the invention will become apparent as the following description is read on the drawings forming a part of this specification.

The invention consists of a cabinet having a conveyor extending therethrough for transporting pans through the cabinet, a spray gun mounted in the cabinet adapted to spray an oil downwardly into the pans while being transported through the cabinet, means adapted to cooperate with the pans for actuating the spray gun, hoods extending over the pan entrance and exit, an updraft fan for the hoods, a condenser for vapors and spray in the hoods, a condenser beneath the transport plane of the conveyor, a collecting trough beneath the condenser, a friction drive for the conveyor, an oil supply tank, a compressor and driving means therefor, and a pan centering device at the feed end of the conveyor.

The invention is adequately illustrated in the accompanying drawings in which similar reference characters are used to indicate identical parts throughout the several views, and in which:

Fig. 1 is a longitudinal vertical elevation of the invention with the adjacent side wall removed so as to clearly illustrate the interior construction and arrangement;

Fig. 2 is a section taken on line 2—2 of Fig. 1 and clearly shows the conveyor, feed and discharge tables and pan centering device;

Fig. 3 is a section taken through the friction driven driving sprocket for the conveyor;

Fig. 4 is a plan view of my preferred form of condenser, with part of the upper section broken away;

Fig. 5 is a sectional elevation taken through the condenser and conveyor showing the mounting means;

Fig. 6 is a fragmentary side elevation of Fig. 5 indicating clearly the conveyor construction and condenser arrangement;

Fig. 7 is a section taken through one of the hoods to indicate the structure and arrangement of the condensers therein;

Fig. 8 is an end view of the ridged construction of the tables.

This invention consists of a cabinet formed of bottom 10, sides 11, front end 12, rear end 13 and an upwardly converging top 14 which forms the lower members of the hoods 15 and 16. A trough or pan 17 is adapted to form the bottom of the spray chamber and a collector for the unused oil from the spray, the portion of the cabinet below the trough 17 forming an enclosure for the compressor 18, motor 19 and speed reducer 20.

The hoods 15 and 16 consist of rectangular housings terminating in a collar 21, to the top of which may be connected a stack or conduit, the lower ends 22 of the hoods being open and extending over the entrance 23 and exit 24 of the cabinet.

An electrically driven discharge fan 25 is mounted in the collar 21 and is adapted to draw a current of air up through hoods 15 and 16 and thereby catch the spray and vapors issuing from the entrance 23 and exit 24.

An oil supply tank 26 is mounted within the collar 21 and has a supply pipe 27 connected to the bottom and communicating with the interior, for supplying oil to the spray gun.

The spraying device consists of a spray gun 28 with a depending nozzle 29, and connected with the compressor 18 by means of a pipe 30 with interposed water trap 31, the oil pipe 27 being connected in suitable manner, with interposed stop cock 32.

Regulating means for the gun as indicated at 33 is covered by a separate application, and consists of means for regulating the amount of oil sprayed, and is actuated by means of a cam 34 secured on the actuating arm 35 which in turn is actuated by a pan 36 cooperating with the shoe 37 which opens the valves in the spray gun 28, whereby the pan is sprayed only during a portion of its travel through the cabinet.

The pan centering device consists of the feed table 38 removably secured to the end 12 of the cabinet by means of hooks 39 and having pivotally mounted on top, as at 40, a pair of centering arms 41, resiliently retracted at the inner ends as by means of a spring 42 cooperating between legs 43 secured to the arms and extending through slots 44 in the top of the table. A discharge table 45 is similarly secured to the end 13 and receives the pans discharged by the conveyor. Hand holes 46 are provided for convenient removal and replacement of the feed and discharge tables.

The conveyor consists of a pair of sprocket chains 47 operating overhead sprockets 48 and tail sprockets 49, which are securely fixed on the head and tail shafts 50 and 51 respectively, which are rotatably mounted in bearings 52. Head shaft 50 has additionally secured thereon a drive sprocket 53 which is driven by a friction secured driving sprocket 54 through a chain 55, the sprocket 54 being mounted on the slow speed shaft 56 of the speed reducer 20.

The friction secured driving sprocket consists of a sprocket 57 rotatably mounted on a sleeve 58 which is keyed to shaft 56 as indicated at 59. Sleeve 58 has an annular flange 60 at one end and is externally threaded at the opposite end. A friction washer 61, preferably of fibre, is interposed between flange 58 and sprocket 57. A similar friction washer 62 is retained against the opposite face of sprocket 57 by means of a washer 63 keyed to the sleeve 58 as indicated at 64, the friction between sprocket 57 and friction washers 61 and 62 being regulated by the cooperating lock nuts 65, which are drawn up just sufficiently to drive the sprocket 57 against a normal load without slipping. By this means, excess load on the conveyor, such as jamming of a pan, would permit the sprocket 57 to remain stationary, being urged only by the friction grip of the washers 61 and 62.

The condenser consists of one or more coextensive wire screens 66 and 67 disposed between the upper and lower strands of the conveyor 47, and screens 68 placed in the hoods 15 and 16. The preferred construction of this condenser system is indicated on a larger scale in Figs. 4 to 7 inclusive, a plan view, Fig. 4, showing a portion of the upper screen 66 broken away to reveal the lower screen 67.

The lower screen 67 consists of a substantially fine mesh screen laid flat and supported in a metal frame 69 which is slidably supported on the brackets 70 secured to the sides 11 of the cabinet.

The upper screen 67 and hood screens 68 consist of a wire screen of coarser mesh than that used for screen 67, and corrugated or formed with a series of ridges, as shown, so as to provide a large condensing area. The screen is preferably secured by means of flanged chairs 71 on which the screen rests, and is secured thereto by means of straps 72 with cooperating bolts 73, the assembled screen being slidably supported on angle brackets 74 secured to the sides 11 of the cabinet.

The specific means for preventing deposition of oil on the outer surfaces of the pans consists of First: Directing the spray downwardly in a truly vertical plane, and actuating the gun only while the pan is traveling directly underneath the gun.

Second: Providing the conveyor 47 with rigid transverse pan supports and carriers 75 which consist of small angles set on the legs with ridge up, forming only an edge contact with the pan disposed thereon, and forming both, the feed and discharge tables, with ridges 76 as indicated in Fig. 8 and disposed longitudinally with the travel of the conveyor.

Escape of oil vapors and loss of oil is obviated by the efficient condenser system, any vapor or spray issuing from the entrance 23 or exit 24 being immediately caught by the up draft through the opening 22 in hoods 15 and 16 and condensed by the condensers 68.

Certain features found in this application are set forth in my copending applications, Serial No. 412,704, filed December 9, 1929, and Serial No. 519,397, filed Mar. 2, 1931.

The specific improvements over my previous applications consist of an unusually efficient condenser system, oil saving system, and a non-jamming conveyor, and it will be understood that variations in construction and arrangement of parts which are consistent with the appended claims may be resorted to without detracting from the spirit or scope of the invention or sacrificing any of the advantages thereof.

I claim:—

1. A pan spraying machine comprising in combination with spray means and pan actuated controlling means therefor, a cabinet, a conveyor extending through said cabinet, pan entrance and exit at the opposite ends of said conveyor, a hood integral with each end of said cabinet and extending over and beyond said entrance and said exit, a screen formed with a series of corrugations in each of said hoods, and means for creating an up draft through said hoods whereby spray and vapor issuing from said entrance and exit is drawn through said screen and condensed thereon.

2. A pan spraying machine comprising in combination with spray means and pan actuated controlling means therefor, a cabinet, a conveyor extending through said cabinet, friction driving means for said conveyor, an entrance and exit at opposite ends of said cabinet, a hood integral with said cabinet and extending over said entrance and said exit, a screen formed with a plurality of corrugations and forming a wall within each of said hoods, and a plurality of screens removably mounted between the upper and lower strands of said conveyor for collecting unused spray from said spraying means.

3. A pan spraying machine comprising in combination with spray means and pan actuated controlling means therefor, a cabinet, a conveyor and driving means therefor, an entrance and an exit for pans, a hood integral with and extending over said entrance and said exit, said hoods communicating with an exhaust collar, an exhaust fan in said collar, screens formed with corrugations and forming transverse walls in said hood, an upper and a lower screen removably mounted between the upper and lower strands of said conveyor for collecting unused spray, said upper screen being of comparatively coarse mesh and formed with a series of corrugations or ridges said lower screen being of finer mesh than said upper screen and having a substantially plane surface, and a collecting trough beneath said conveyor for receiving oil condensed on said screens, and friction driving means for said conveyor.

4. A pan spraying machine comprising a cabinet provided with pan entrance and exit openings and collecting hoods projecting over said openings, a pan conveyor provided with ridged elements adapted to provide only line contact with the bottoms of the pans to prevent transfer of oil thereto, a feed table, longitudinally ridged pan aligning means on said feed table, a discharge table provided with longitudinal ridges providing line contact on the bottoms of the pans, and downwardly directed spray means in said cabinet adapted to be controlled by pans transported by said conveyor.

In testimony whereof I affix my signature.

SVEN P. LARSON.